Sept. 20, 1971      R. D. CHAPIN      3,606,167
SPRAY SYSTEM
Filed June 11, 1969      2 Sheets-Sheet 1
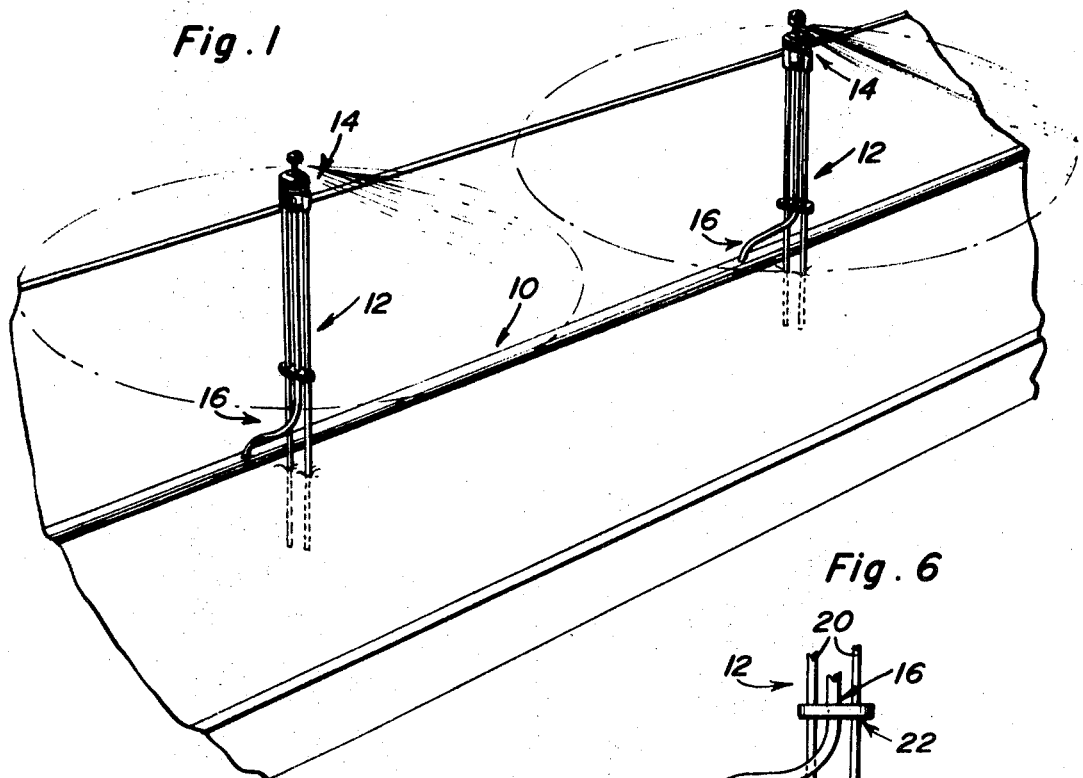
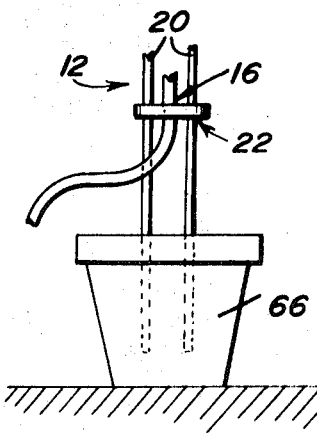
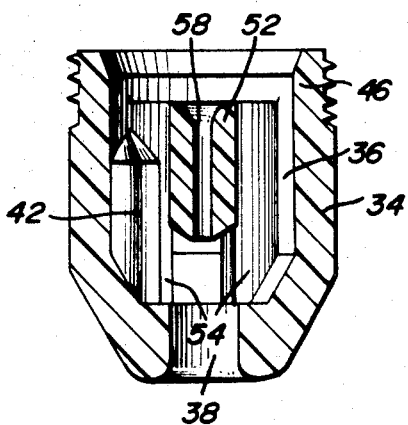
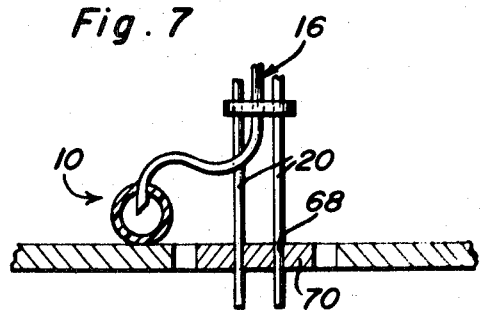
Richard D. Chapin
INVENTOR.
BY *Clarence A. O'Brien*
*and Harvey B. Jacobson*
Attorneys Sept. 20, 1971     R. D. CHAPIN     3,606,167
SPRAY SYSTEM
Filed June 11, 1969     2 Sheets-Sheet 2
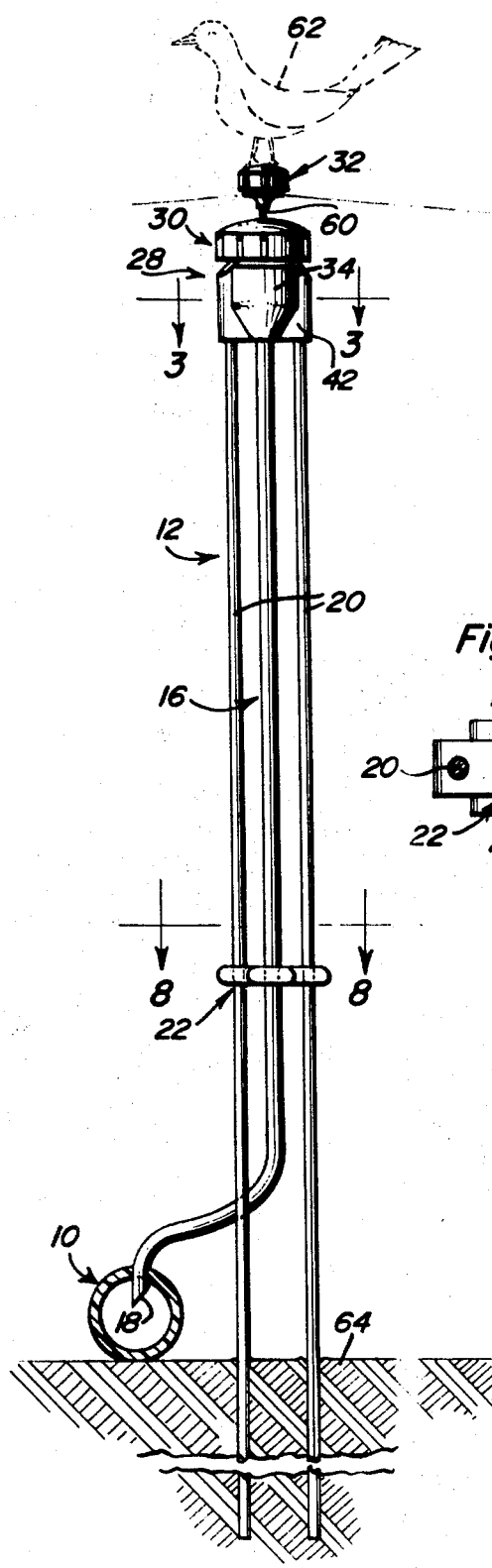
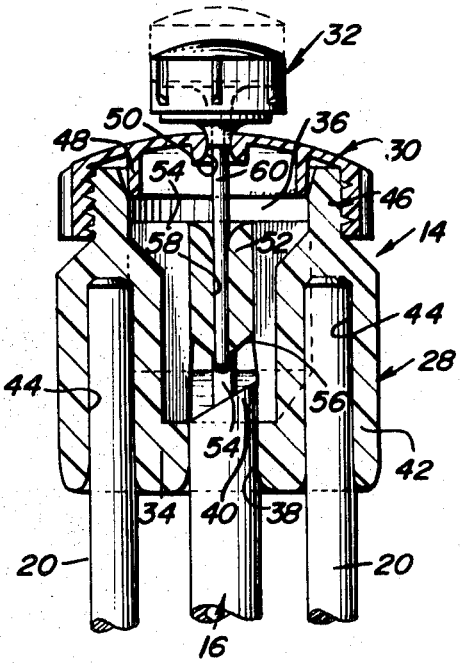
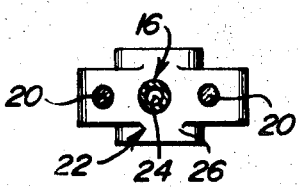
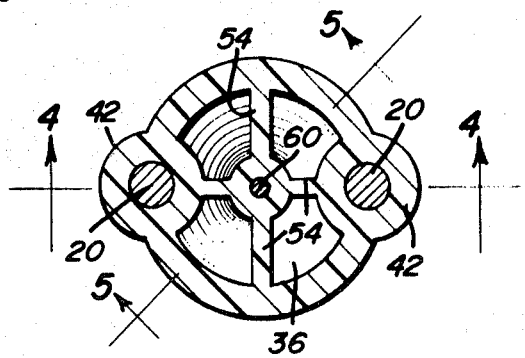
Richard D. Chapin
INVENTOR.

3,606,167
SPRAY SYSTEM
Richard D. Chapin, P.O. Box 298,
Watertown, N.Y. 13601
Filed June 11, 1969, Ser. No. 832,145
Int. Cl. B05b 15/02
U.S. Cl. 239—276      5 Claims

ABSTRACT OF THE DISCLOSURE

A watering system for long runs consisting of a series of elevated nozzles, each mounted on a twin rod upright and communicated with an enlarged main through a reduced diameter supply tube. The individual supply tubes meter the pressure to the individual nozzles, thereby enabling the maintenance of a substantially constant high pressure along the full length of the main. Each of the nozzles includes a manual cut-off directly therein.

---

The instant invention is generally concerned with distributing water over long runs in an even, a thorough, and an economical manner. More specifically, the invention herein is concerned with a spray system consisting of a plurality of uprights longitudinally spaced along an elongated flexible water main, each of the uprights mounting a distributing nozzle at the upper end thereof which is in turn directly supplied from the main through a reduced diameter supply tube.

It is a primary object of the instant invention to provide a spray system for greenhouse benches and the like which significantly improves on the more conventional spray systems wherein rigid pipes are utilized. A rigid pipe system requires, in addition to a rigid supply pipe, the drilling and tapping of the pipe for the accommodation of the water distributing spray nozzles. In view of the rigid fixed nature of the system, it will be appreciated that substantial care has to be taken to align the nozzles so as to properly and uniformly direct the spray, this in turn often requiring a supporting framework to avoid any misorientation of the main pipe and nozzles thereon. Further, as will be appreciated, such a system is not adaptable for movement to different locations. In order to avoid these problems, applicant has devised a unique system incorporating a high degree of flexibility and adaptability through the utilization of not only flexible tubes, but also adjustably positionable uprights, all of which combine to make an inexpensive, highly practical, and easily adaptable system. Toward this end, the system of the instant invention includes an elongated polyethylene water main along which are positioned a series of uprights which in turn consist of two laterally spaced interconnected vertical rods mounting a nozzle or distributing head at the upper end thereof. Each of the uprights, and more particularly the nozzles thereon, is connected to the main through an elongated flexible supply tube of a substantially reduced diameter relative to the main. The supply tube is, through the nature of the tube, the main and the nozzle, frictionally engaged with both the main and the nozzle so as to avoid the necessity for tapping or otherwise elaborately forming nozzle mounting means. By the same token, the flexible nature of the supply tube enables a shifting of the corresponding upright so as to vary the orientation of the nozzle and maintain the upright orientation thereof with no difficulty.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a portion of a greenhouse bench with the system of the instant invention mounted thereon;

FIG. 2 is an enlarged elevational view of one of the uprights of the instant invention with the communicated water main being seen in cross-section;

FIG. 3 is an enlarged cross-sectional view through the rod-engaging portion of the nozzle, taken substantially on a plane passing along line 3—3 in FIG. 2;

FIG. 4 is a cross-sectional view taken substantially on a vertical plane passing along line 4—4 in FIG. 3;

FIG. 5 is a cross-sectional view taken substantially on a plane passing along line 5—5 in FIG. 3 and illustrating only the nozzle body;

FIG. 6 illustrates the adaptability of the uprights of the instant invention for use directly within plant pots;

FIG. 7 illustrates the mounting of an upright directly through the planking of a greenhouse bench; and FIG. 8 is an enlarged cross-sectional view taken substantially on a plane passing along line 8—8 in FIG. 2.

Referring now more specifically to the drawings, the system of the instant invention basically includes an elongated water supplying main 10, a series of twin rod uprights 12 positioned longitudinally along the main 10, a nozzle 14 mounted on the upper end of each of the uprights 12, and an elongated flexible supply tube 16 communicating each upright mounted nozzle 14 with the main 10.

The water main 10 and the individual supply tubes 16, of a substantially reduced diameter relative to the main 10, are both made of an appropriate plastic material such as polyethylene, the main 10 and the supply tube 16 being tubular in construction. The actual connection of each supply tube 16 to the main 10 is effected by merely punching a hole through the wall of the main 10 of a diameter slightly less than the external diameter of the supply tube and forcing a beveled end 18 of one of the supply tubes 16 through the punched hole in the main 10, the slightly resilient nature of both the main and the supply tube 16 insuring a firm frictional gripping of the inserted end of the supply tube 16.

Each of the uprights 12 is formed of a pair of rigid vertically elongated laterally spaced rods 20 which are laterally fixed relative to each other through the top mounted nozzle 14 and through one or more spacers 22 provided along the vertical length of the rods 20. Each of the spacers 22, noting FIG. 8 in particular, receives the laterally spaced rods 20 through laterally spaced portions thereof and likewise receives the vertically projecting supply tube 16 through a vertical aperture 24 defined through the laterally enlarged central portion 26 of the spacer 22. The lateral enlargement of the central portion of the spacer 22 is to the opposite sides of the central tube receiving opening 24 and provides additional material so as to avoid a weakeining of the spacer 22 in the area of the enlarged central tube opening 24.

The nozzle 14 includes a one-piece plastic body 28, formed of polyethylene or the like, a removable plastic cap 30, and an adjustable plastic diffuser head 32. The main body 28 of the nozzle 14 includes an enlarged generally cylindrical central section 34 which includes an enlarged upwardly directed internal chamber 36 which opens, through an enlarged upper mouth portion, through the upper end of the body 28. The bottom of the central portion 34 of the body 28 is provided with a central aperture 38 communicating directly with the interior of the chamber 36 and of a size so as to frictionally receive and retain the second end portion 40 of a supply tube 16. In this manner, water, from the water main 10, is supplied directly to the outwardly opening enlarged chamber 36 within the nozzle body 34. Extending outwardly in diametrically opposed orientation are a pair of cylindrical wing portions 42, each of which includes a downwardly directed elongated vertical blind bore 44. These bores 44 snugly receive and frictionally retain the upper end portions of the dual rods 20 which define the upright 12. Thus, not only is the nozzle 14 mounted in an elevated position on the rods 20, but the nozzle 14 also acts as a spacing means for the upper portion of the rods 20.

The nozzle cap 30 is internally threaded and threadedly received on an upwardly projecting externally threaded annular flange 46 integrally formed about the top of the nozzle body 28 and defining the enlarged mouth of the upwardly directed chamber 36. In addition, the cap 30 is provided with an inwardly spaced annular flange 48 which is received just inwardly of the body flange 46 and tends to seal thereagainst so as to preclude leakage of the pressurized water flow peripherally about the cap 30. Finally, the cap 30 is provided with a central discharge opening 50 vertically therethrough, this opening 50 being provided with an inwardly directed flared mouth. Thus, water introduced into the upwardly directed enlarged and capped chamber 36 will discharge through the central cap opening 50.

Mounted centrally within the enlarged chamber 36 is a vertically elongated cylindrical member 52 spaced inwardly from the walls of the chamber 36, and in spaced relation to the upper and lower ends thereof, by four radially projecting internal ribs 54 integrally formed with both the central member 52 and the surrounding chamber wall. This cylindrical member 52 is so located as to terminate above the inserted end portion 40 of the corresponding supply tube 16 whereby a free flow of water from the supply tube 16 into the chamber 36 will not be affected, this free flow being encouraged by the inverted conical configuration of the lower end 56 of the central member 52. Incidentally, it should be appreciated that the tube receiving passage 38, in order to enhance the frictional grip on the end of the tube 16, tapers slightly inward, this taper continuing along the lower portions of the ribs 54.

The central member 52 includes a vertical passage 58 therethrough which frictionally receives an elongated rigid rod 60. The rod 60 in turn extends vertically through the cap opening 50 and mounts the diffuser or distributing head 32 on the upper end thereof. The head 32, where it engages the upper end portion of the rod 60, is generally conically configured, as will be best appreciated from FIGS. 2 and 4, whereby the vertically discharging water will engage thereagainst and be laterally outwardly directed in a circular pattern. It will of course be appreciated that the cap opening 50 is of a size substantially greater than that of the rod 60 whereby upon a positioning of the diffuser head 32 vertically away from the cap 30, as indicated in phantom lines in FIG. 4, the pressurized water within the chamber 36 will easily pass through the opening 50 for engagement against the flared undersurface of the head 32. The rod 60 is of a length relative to the central member 52 so as to maintain a positive retention, through the frictional engagement of the rod 60 with the central member passage 58, in an elevated water diffusing position. By the same token, upon a downward movement of the diffuser head 32, the conical undersurface thereof will tightly engage directly in the cap opening 50 and effectively seal off the flow of water, the frictional engagement of the rod 60 within the central member 52 being such so as to resist the internal water pressure. Thus, it can be appreciated that the spray discharge of water from each of the nozzles 14 can be effectively manually controlled by either a raising or lowering of the diffuser head 32. Incidentally, gripping ribs can be integrally molded on the diffuser head 32 so as to enable a positive gripping and possibly a slight rotation thereof should such be necessary in vertically moving the head.

Another significant feature of the instant invention, arising from the fact that the water is diffused or distributed from the undersurface of the head 32, is that an actual ornament 62, for example a bird as suggested in FIG. 2, can be mounted directly on the top of the head 32 without affecting the spray pattern. Such an ornament would be particularly desirable were the system of the instant invention adapted for outdoor use, for example in home lawn or shrub watering systems. This possibility of use in this manner will of course be readily apparent, notwithstanding the primary intent of the instant invention to provide a system for use in greenhouses, nurseries, and the like.

With reference to FIGS. 1, 2, 6 and 7, it will be appreciated that the uprights 12 can be engaged directly into a dirt bed 64, into individual flower pots 66, or through predrilled holes 68 within bench planks 70 or the like. The utilization of laterally spaced rigid rods 20 is particularly significant in that the weight of the uprights is maintained at a minimum, while at the same time providing a high degree of rigidity and lateral stability which insures a retention of the vertical orientation of the upright 12.

In actual us, a length of polyethylene tubing, normally ¾" or 1" in diameter, is positioned along the desired run, and provided with connector means at one end thereof for engagement with a source of pressurized water. This flexible tube constitutes the main 10 and has a series of small diameter holes punched along the length thereof for the frictional reception of the first ends of a series of reduced diameter feeder tubes 16. The holes in the main 10 which receive the feeder tube ends 18 are, as one example, provided at 40 inch spacings so as to result in a spray pattern wherein a full overlap occurs utilizing a conventionl pressure source. Further, in view of the flexible nature of the feeder tubes 16, the holes in the main 10 need not be exactly aligned, and in fact could be substantially out of alignment with each other without affecting the spraying. This results from a combination of the flexible nature of the feeder tubes 16 and the utilization of stable uprights 12 so as to properly vertically orientate the nozzles 14 regardless of the angle at which the corresponding feeder tubes enter the main 10. Each of the uprights 12 has the twin rods 20 thereof rigidly positioned in laterally spaced relation to each other by both the nozzle body 28 and by one or more spacers 22 positioned vertically along the rods 20, both the spacer or spacers 22 and the nozzle body 28 receiving and retaining the feeder tubes 16 for a direction of the flow of water from the main 10 upwardly through the distributing nozzle. The utilization of feeder tube 16 of a substantially reduced diameter relative to the main 10 is also of significance in that these tubes act so as to monitor the pressure within the main 10 and introduce only such a flow of water to the nozzles 14 as can be effectively distributed by the nozzle. This metering of the water directly at the main rather than at the nozzle results in the maintenance of the pressure within the main at a fairly constant level throughout extremely long runs, thereby adopting the system for normal pressures and resulting in a substantial conservation of water. Were, on the contrary, large diameter supply tubes utilized, the pressure drop along the length of the main 10 would be substantial, notwithstanding a monitoring of the flow directly at the nozzle itself. Such a pressure drop, as indicated supra, is avoided in the instant invention through a monitoring of the flow directly at the main itself by means of the utilization of small diameter feeder tubes, each sufficient so as to supply to the corresponding nozzle only the pressurized flow which can be properly distributed by that particular nozzle. Incidentally, while not specifically limited thereto, it is contemplated that the supply tubes 16 have an internal flow passage on the order of ⅛" in diameter. Additional features which should be appreciated include the fact that the water main 10 can twist or displace, such as might occur were individual pots to be pushed thereagainst, without affecting the orientation of the upright supported nozzles. Any misorientation of a rigid system, as is now more conventionally utilized, would automatically result in a disorientation of the nozzles and a diverting of the spray which, as will be recognized, would be highly undesirable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a spray system for plants, nursery stock, and the like, an elongated water main, a plurality of supply tubes positioned at spaced points therealong, each supply tube having first and second ends, the first end of each supply tube being in flow receiving communication with the water main, a nozzle fixed to the second end of each supply tube in flow receiving communication therewith for an outward spraying of the received flow, a plurality of vertically elongated uprights comprising nozzle mounting upper ends and support engaging lower ends, each nozzle being mounted on the upper end of one of said uprights, each of said supply tubes being of a substantially lesser diameter than said elongated main whereby a restricted flow of water moves therethrough from the main to the nozzle, said supply tubes also being flexible whereby a variation in the orientation of the nozzles relative to the main can be effected through a movement of the nozzle mounting uprights, each of said uprights comprising a pair of laterally spaced thin rigid rods, each nozzle including a pair of downwardly directed sockets, said sockets frictionally receiving the upper ends of the corresponding pair of upright rods whereby a retention of the nozzle on the rods is effected along with a retention of the rods in laterally spaced relation to each other, and a spacer interconnecting said rods in spaced relation to each other vertically below said nozzle, said spacer receiving and positioning a portion of the corresponding flexible supply tube, each nozzle including a one-piece molded body, an upwardly directed chamber defined centrally within said body and opening through the upper end thereof, a tube receiving passage through the lower end of said body frictionally receiving and retaining the second end of the corresponding supply tube for an introduction of the flow into the chamber, a removable cap engageable over the upper end of said body, a discharge opening provided centrally through said cap, and a diffuser head mounted over said cap opening for the reception of the flow and the outward directing thereof in a predetermined pattern about the nozzle, said diffuser head being vertically adjustable so as to selectively close said cap opening and preclude the flow of water therefrom.

2. Mounting construction for a nozzle including vertically orientated body means with a vertical fluid passage therein terminating in an upwardly directed discharge, said construction comprising two elongated bores formed longitudinally in said body generally parallel to said vertical fluid passage and adjacent thereto, and two vertically elongated support rods, each rod having an upper end frictionally received and retained in one of said bores, and a lower end defining a support engaging means, said vertical fluid passage and said bores opening through the bottom of said body, a flexible supply tube having one end thereof frictionally received within the bottom portion of the vertical fluid passage, said supply tube extending therefrom between and generally parallel to the rods, and means for retaining the supply tube between the rods for a distance along the length thereof.

3. For use in a spray system, a nozzle and support therefor, said nozzle comprising a vertically orientated body having upper and lower ends, a single vertical water discharge at the upper end of said body, a flow path through said body and in communication with said vertical discharge, said body having a plurality of vertically directed bores extending longitudinally therein through said lower end, said support comprising a plurality of elongated vertical rods, said rods being orientated in closely spaced parallel relation to each other, each rod having an upper end portion frictionally received within one of said body bores for a mounting of the nozzle thereon, said rods extending longitudinally from said nozzle, a diffuser head mounted on said body in overlying spaced relation to said water discharge, said diffuser head having an undersurface configured to effect a directing of the water from the single discharge in a spray pattern above, outward of and completely about the vertical rods and below the diffuser head, said diffuser head being vertically adjustable and selectively movable to engage a portion thereof in said discharge and preclude the flow of water therefrom.

4. The invention of claim 3 wherein said flow path extends vertically through the lower end of said body, and a supply tube positioned generally between and parallel to said support rods, said supply tube having an upper end frictionally positioned within the lower end of said flow path.

5. For use in a spray system, a nozzle and support therefor, said nozzle comprising a vertically orientated integral plastic body having upper and lower ends, a single vertical water discharge at the upper end of said body, a flow path formed in and through said body and in communication with said vertical discharge, a supply tube having one end frictionally engaged within said flow path below said water discharge for the introduction of water thereto, said body having a plurality of vertically directed bores extending longitudinally therein through said lower end, said support comprising two elongated vertical rods, said rods being orientated in closely spaced parallel relation to each other, each rod having an upper end portion frictionally received within one of said body bores for a mounting of the nozzle thereon, said rods extending longitudinally from said nozzle, and, for the full length thereof, being within the lateral confines defined by the width of the body.

References Cited

UNITED STATES PATENTS

| 3,101,176 | 8/1963 | Goss | 239—524 |
| 648,263 | 4/1900 | Hull | 239—269X |
| 1,735,376 | 11/1929 | Carey | 239—273 |
| 1,959,886 | 5/1934 | Wadsworth | 239—280.5 |
| 2,631,061 | 3/1953 | Nelson | 239—276X |
| 2,792,257 | 5/1957 | Davis | 239—276 |
| 2,943,798 | 7/1960 | Reinks | 239—204X |
| 3,006,558 | 10/1961 | Jacobs | 239—276X |
| 3,199,784 | 8/1965 | Chapin | 239—65 |
| 3,361,363 | 1/1968 | Babington | 239—267 |

FOREIGN PATENTS

| 269,121 | 11/1929 | Italy | 239—281 |
| 559,650 | 7/1957 | Belgium | 239—211 |

M. HENSON WOOD, Jr., Primary Examiner

M. Y. MAR, Assistant Examiner

U.S. Cl. X.R.

239—118, 280, 547, 550